UNITED STATES PATENT OFFICE.

SYLVESTER ZUCKSCHWERDT, OF LEOPOLDSHALL, GERMANY.

METHOD OF MAKING CYANIDS.

SPECIFICATION forming part of Letters Patent No. 682,311, dated September 10, 1901.

Application filed June 4, 1900. Renewed February 8, 1901. Serial No. 46,584. (No specimens.)

*To all whom it may concern:*

Be it known that I, SYLVESTER ZUCKSCHWERDT, a subject of the Emperor of Germany, and a resident of Leopoldshall, Duchy of Anhalt, Germany, have invented certain new and useful Improvements in the Production of Cyanids, of which the following is a specification.

It is known that cyanids can be produced by discomposing carbon and an alkali in the presence of ammonia at a red heat. (See the specification of Siepermanns, German Patents Nos. 38,012 and 51,562.) In this process the mixture of carbon and powdered alkali is placed in a vertical retort, the lower part of which is heated to a clear or light red heat, and then the ammonia is introduced. Under these conditions it is found that the powdered alkali, mixed with the carbon, has a tendency to fuse or run together under the action of the heat and cause a caking together of the charge, so that the retort becomes choked or blocked up, and the regular progress of the operation is interrupted. This objection is obviated by conducting the operation as hereinafter described, and, among other advantages, the correct proportion can be invariably maintained between the alkali and the carbon in every part of the reacting mixture, and only the amount of alkali necessary to enable the desired reaction to take place need be used.

According to this invention the carbon is saturated or impregnated with a solution of the alkali (in place of mixing it mechanically with the alkali in the form of a dry powder) and then it is dried and placed in the retort.

In order to obtain an intimate and thorough impregnation of the carbon with the alkali and thereby insure a uniform, energetic, and effectual reaction, it is recommended to proceed as follows: Coarsely-powdered charcoal is exposed to the action of steam in a suitable vessel, whereby gases occluded in the carbon are expelled. The steamed carbon, still containing a certain quantity of gas, is then boiled in water or in a very weak alkaline lye for a considerable time, so that all the gases are removed, and when this has been effected (which is indicated by the carbon sinking to the bottom of the vessel) the liquid is drawn off and replaced by a strong solution of the required alkali. As a result of the previous treatment of the carbon with steam and water this solution penetrates into the minutest capillaries, interstices, or pores of the carbon, the said solution being caused to circulate in the vessel until all the water previously contained in the carbon has been replaced by the alkaline solution. The excess of lye is then run off and the carbon is taken out of the vessel and dried in a suitable receptacle, being exposed to a gentle heat, with exclusion of air, until steam or watery vapor ceases to be given off. The carbon is thus impregnated in with the requisite alkali, which is deposited the minutest capillaries, interstices, or pores of the carbon, and the contact between the two substances is the closest possible, thus enabling the reaction to take place under the most favorable conditions. The carbon thus impregnated is placed in a vertical retort, where it is allowed to react with the ammonia by the application of external heat. As the alkali is present in the carbon in finely-divided and uniformly-distributed quantities it is impossible for it to fuse or run together, as even if the particles commence to fuse they are retained in a finely-divided condition by the carbon, which has absorbed them. Consequently no caking together of the charge can take place even at the lightest red heat, and a continuous action is insured.

The percentage of cyanid produced by means of this process is considerably greater than that obtainable by proceeding according to the old processes.

I claim—

1. In or for the manufacture of cyanids by heating carbon and an alkali in the presence of ammonia, removing gases from coarsely-powdered carbon, impregnating the carbon so treated with a concentrated solution of the alkali, and then drying it with exclusion of air.

2. In or for the manufacture of cyanids by heating carbon and an alkali in the presence of ammonia, impregnating the carbon with the alkali by steaming coarsely-powdered carbon, then boiling it in a suitable liquid and thus removing the gases, and then saturating the carbon so treated with a strong solution of alkali with continuous circulation of the latter until all the water absorbed by the carbon is replaced by the alkaline lye.

In testimony whereof I have signed my name to this specification in the presence of two subscribing witnesses.

SYLVESTER ZUCKSCHWERDT.

Witnesses:
HEINRICH GÖRIG,
MAX LOERCHE.